(12) United States Patent
Lim

(10) Patent No.: US 8,208,060 B2
(45) Date of Patent: Jun. 26, 2012

(54) CAMERA MODULE

(75) Inventor: Hae Keun Lim, Ansan-si (KR)

(73) Assignee: LG Innotek Co., Ltd., Seoul (KR)

( * ) Notice: Subject to any disclaimer, the term of this patent is extended or adjusted under 35 U.S.C. 154(b) by 656 days.

(21) Appl. No.: 12/333,364

(22) Filed: Dec. 12, 2008

(65) Prior Publication Data

US 2009/0153726 A1    Jun. 18, 2009

(30) Foreign Application Priority Data

Dec. 13, 2007    (KR) .................. 10-2007-0129746

(51) Int. Cl.
*H04N 5/225*    (2006.01)
(52) U.S. Cl. ....................................... 348/360
(58) Field of Classification Search .................. 348/335, 348/360; 227/266; D16/200; 359/821
See application file for complete search history.

(56) References Cited

U.S. PATENT DOCUMENTS

2007/0024739 A1*    2/2007    Konno ........................ 348/337
2009/0201578 A1*    8/2009    McClatchie ................. 359/356

FOREIGN PATENT DOCUMENTS

| EP | 0906587 B2 | 4/1999 |
| EP | 0906587 B2 * | 4/1999 |
| JP | 2003-098430 A | 4/2003 |
| WO | WO-97/49003 A1 | 12/1997 |

OTHER PUBLICATIONS

Office Action dated May 18, 2011 in Chinese Application No. 200810185149.6, filed Dec. 11, 2008.

* cited by examiner

*Primary Examiner* — Lin Ye
*Assistant Examiner* — Vineet Lall
(74) *Attorney, Agent, or Firm* — Saliwanchik, Lloyd & Eisenschenk

(57) ABSTRACT

Disclosed is a camera module. The camera module includes a lens unit including a first reflective member that reflects and corrects incident light, a second reflective member that reflects the light passing through the lens unit, an image sensor that converts the light reflected from the second reflective member into an electric signal, a PCB electrically connected with the image sensor, and a holder that fixes the lens unit, the second reflective member, the image sensor and the PCB thereto.

15 Claims, 2 Drawing Sheets

CAMERA MODULE

CROSS-REFERENCE TO RELATED APPLICATION

The present application claims the benefit under 35 U.S.C. §119 of Korean Patent Application No. 10-2007-0129746, filed Dec. 13, 2007 which is hereby incorporated by reference in its entirety.

BACKGROUND

Recently, with the development of communication technology and digital information processing technology, new technology has been developed to provide a portable terminal equipped with various functions, such as information processing, operation, communication and image information input/output.

A PDA (personal digital assistant) equipped with digital camera and communication functions, a cellular phone having a digital camera function, and a PMP (personal multimedia player) are representative examples.

Further, as digital camera technology and information storage capability have been developed, a digital cameral module having specifications of high quality has been extensively used.

BRIEF SUMMARY

An embodiment relates to a camera module.

A camera module according to an embodiment includes a lens unit including a first reflective member that reflects and corrects incident light; a second reflective member that reflects the light passing through the lens unit; an image sensor that converts the light reflected from the second reflective member into an electric signal; a PCB electrically connected with the image sensor; and a holder that fixes the lens unit, the second reflective member, the image sensor and the PCB thereto.

DETAILED DESCRIPTION

Hereinafter, a camera module according to an embodiment will be described in detail with reference to the accompanying drawings.

Figure 1:
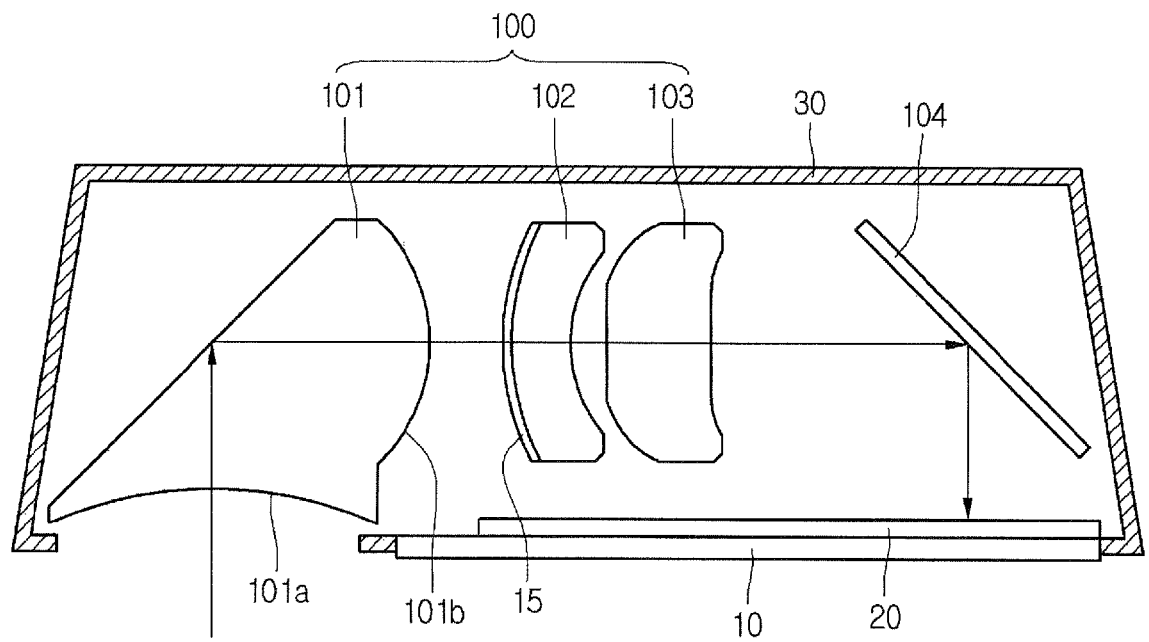
FIGS. 1 and 2 are cross-sectional views schematically showing a camera module according to an embodiment.
Figure 2:
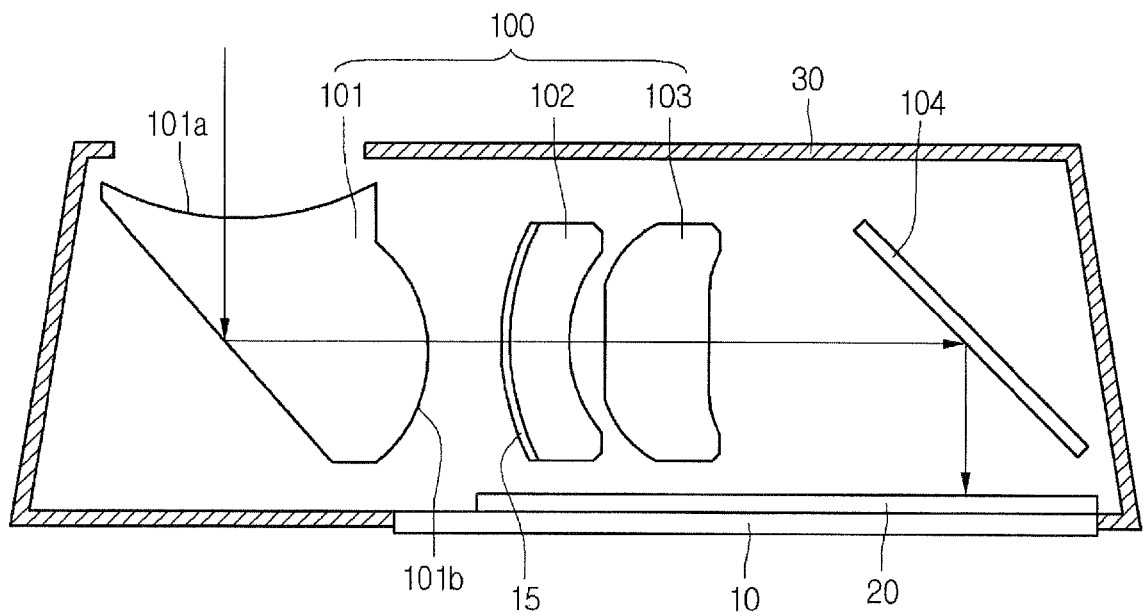

FIGS. 1 and 2 are cross-sectional views schematically showing the camera module according to an embodiment.

As shown in FIGS. 1 and 2, the camera module according to the embodiment includes a lens unit 100, a second reflective member 104, an image sensor 20, a PCB (printed circuit board) 10 and a holder 30.

The lens unit 100 includes a first reflective member 101, a first lens 102 and a second lens 103.

The first reflective member 101 includes a prism and may have lens surfaces on an incidence surface 101a and an exit surface 101b thereof.

The incidence surface 101a and the exit surface 101b can be prepared in the form of a convex lens surface or a concave lens surface. The convex lens surface or the concave lens surface may have an aspheric shape.

The incidence surface 101a and the exit surface 101b can be prepared in the form of a convex lens surface or a concave lens surface, so that an angle of view can be determined and refraction and aberration can be corrected.

The exit surface 101b of the first reflective member 101 is disposed toward the first lens 102, the second lens 103 and the second reflective member 104.

As shown in FIG. 1, the incidence surface 101a may be formed at a lower portion of the holder 30 where the image sensor 20 and the PCB 10 are formed. In contrast, as shown in FIG. 2, the incidence surface 101a may be formed at an upper portion of the holder 30 which is opposite to the image sensor 20 and the PCB 10.

However, the position of the incidence surface 101a is not limited to the upper portion or the lower portion of the holder 30. In detail, the incidence surface 101a can be disposed such that the light incident in any direction can travel toward the first and second lenses 102 and 103 after being reflected from the first reflective member 101.

The lens unit 100 including the first reflective member 101, and the first and second lenses 102 and 103 can perform aberration correction relative to incident light.

Since the first lens 102 is coated with infrared blocking material 15, an infrared ray blocking filter is not additionally necessary.

In the present embodiment, the infrared blocking material 15 is formed on the first lens 102. However, the scope of the present invention is not limited thereto. In detail, the infrared blocking material 15 can be formed on at least one surface of the first and second lenses 102 and 103.

The infrared blocking material 15 inhibits radiant heat emitted from external light from being transferred to the image sensor 20.

In detail, the infrared blocking material 15 allows visible ray to pass therethrough and reflects infrared ray.

Further, in the present embodiment, the lens unit 100 includes two lenses. However, the scope of the present invention is not limited thereto. In detail, the lens unit 100 may include lenses of two or more or two or less.

The second reflective member 104 can be prepared in the form of a reflecting mirror.

The second reflective member 104 can reflect the light, which has passed through the lens unit 100, toward the image sensor 20.

The second reflective member 104 can be located on the same horizontal plane with the first reflective member 101, and the first and second lenses 102 and 103.

The direction of the light can be changed by the first and second reflective members 101 and 104, so that the height of the camera module can be lowered.

The image sensor 20, which converts an optical signal corresponding to an image of an object into an electric signal, can be prepared in the form of a CCD (charge coupled device) sensor or a CMOS (complementary metal oxide semiconductor) sensor. Further, the image sensor 20 is electrically connected with the PCB 10 under the image sensor 20.

The lens unit 100 and the second reflective member 104 are aligned on the same horizontal plane and the image sensor 20 is disposed in parallel to the horizontal plane.

Further, the light, which passes through the first and second lenses 102 and 103 after being reflected from the first reflective member 101, can travel in parallel to the image sensor 20.

The image sensor 20 is disposed in parallel to the horizontal plane, so that the height of the camera module can be lowered.

Further, the holder 30 fixes the lens unit 100, the second reflective member 104, the image sensor 20 and the PCB 10 thereto.

Figure 3:
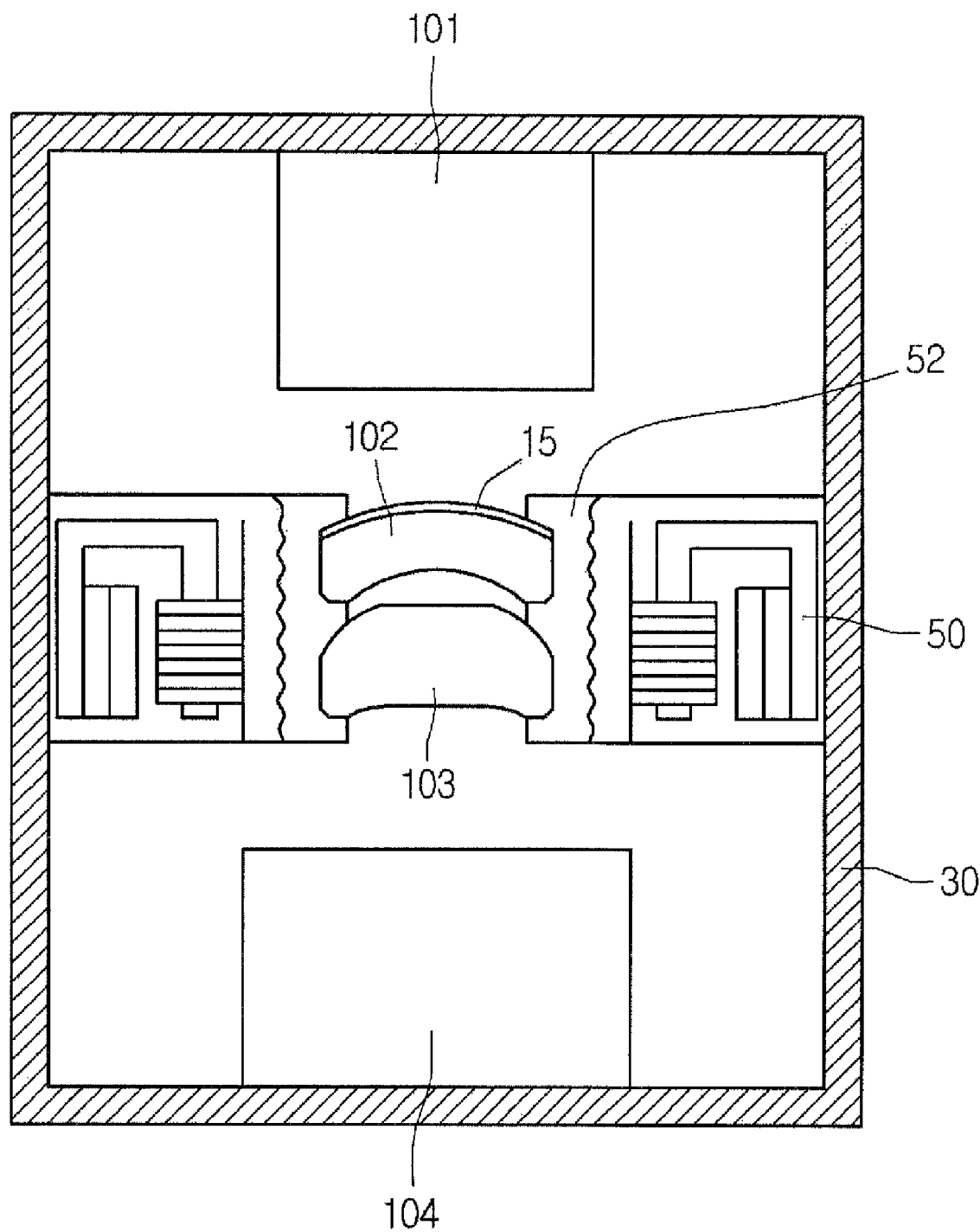
FIG. 3 is a plan view of a camera module according to an embodiment.

FIG. 3 is a plan view of the camera module according to the embodiment.

As shown in FIG. 3, the first reflective member 101, the first lens 102, the second lens 103 and the second reflective member 104 are aligned on the same horizontal plane.

The holder 30 is provided with a lens barrel 52, in which the first and second lenses 102 and 103 are mounted, and an actuator 50 coupled with the lens barrel 52.

The actuator 50 is coupled with the lens barrel 52 to adjust focuses of the first and second lenses 102 and 103 by controlling positions of the first and second lenses 102 and 103. Further, the actuator 50 can perform automatic focus and optical zoom functions. The actuator 50 can use a piezoelectric element, a stepping motor, a VCM (voice coil motor) and the like.

Even if the camera module is equipped with the actuator 50 that performs the optical zoom function, little difference occurs in the height of the camera module.

Although not shown in FIG. 3, the PCB 10 including the image sensor 20 is formed below the lens unit 100 and the second reflective member 104.

According to the camera module of the embodiment, the height of the camera module can be lowered by changing direction of light using the prism and the reflecting mirror.

Further, since the lens coated with the infrared blocking material is used, an infrared blocking filter is not additionally necessary.

Furthermore, a concave or convex lens is formed on the incidence surface and the exit surface of the prism, so that an angle of view can be determined and refraction and aberration can be corrected.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A camera module comprising:
a lens unit including a first reflective member that reflects and corrects incident light, a first lens, and a second lens;
a second reflective member that reflects the light passing through the lens unit;
an image sensor that converts the light reflected from the second reflective member into an electric signal;
a PCB (printed circuit board) electrically connected with the image sensor; and
a holder that fixes the lens unit, the second reflective member, the image sensor and the PCB thereto,
wherein the first lens is disposed between the first reflective member and the second lens,
wherein an infrared blocking material is coated on an incident surface of the first lens, and
wherein the incident surface of the first lens faces the first reflective member.

2. The camera module according to claim 1, wherein the lens unit and the second reflective member are located on a same horizontal line.

3. The camera module according to claim 2, wherein the image sensor is disposed in parallel to the horizontal line.

4. The camera module according to claim 1, wherein the first reflective member and the at least one lens are located on a same horizontal line.

5. The camera module according to claim 1, wherein the first reflective member includes a prism.

6. The camera module according to claim 5, wherein the prism has a convex or concave lens on an incidence surface thereof, and wherein the prism has a convex or concave lens on an exit surface thereof.

7. The camera module according to claim 5, wherein at least one of an incidence surface and an exit surface of the prism has an aspheric shape.

8. The camera module according to claim 5, wherein an incidence surface of the prism is formed at a lower portion of the holder where the image sensor and the PCB are formed.

9. The camera module according to claim 5, wherein an incidence surface of the prism is formed at an upper portion of the holder which is opposite to the image sensor and the PCB.

10. The camera module according to claim 1, wherein the second reflective member includes a reflecting mirror.

11. The camera module according to claim 1, further comprising a lens barrel, in which the lens unit is mounted; and an actuator coupled with the lens barrel.

12. The camera module according to claim 11, wherein the actuator includes one of a piezoelectric element, a stepping motor, and a VCM (voice coil motor).

13. The camera module according to claim 1, wherein the light passing through the lens unit travels in parallel to the image sensor.

14. A camera module comprising:
a lens unit including a first reflective member that reflects and corrects incident light, a first lens, and a second lens;
a second reflective member that reflects the light passing through the lens unit;
an image sensor that converts the light reflected from the second reflective member into an electric signal;
a PCB (printed circuit board) electrically connected with the image sensor; and
a holder that fixes the lens unit, the second reflective member, the image sensor, and the PCB thereto;
wherein the first lens is disposed between the first reflective member and the second lens,
wherein an infrared blocking material is coated on a incident surface of the first lens,
wherein the incident surface of the first lens faces the first reflective member,
wherein the first reflective member includes a prism,
wherein the prism has a concave incidence surface and a convex exit surface, and
wherein at least one of the incidence surface and the exit surface of the prism has an aspheric shape.

15. A camera module comprising:
a lens unit including a first reflective member that reflects and corrects incident light, a first lens and a second lens;
a second reflective member that reflects the light passing through the lens unit;
an image sensor that converts the light reflected from the second reflective member into an electric signal;
a PCB (printed circuit board) electrically connected with the image sensor;
a holder that fixes the lens unit, the second reflective member, the image sensor, and the PCB thereto;
a lens barrel, in which at least a portion of the lens unit is mounted; and
an actuator coupled with the lens barrel, wherein the actuator controls a position of the first and second lenses between the first reflective member and the second reflective member;
wherein the first lens is disposed between the first reflective member and the second lens,
wherein an infrared blocking material is coated on a incident surface of the first lens,
wherein the incident surface of the first lens faces the first reflective member,
wherein the first reflective member includes a prism,
wherein the prism has a concave incidence surface and a convex exit surface, and
wherein at least one of the incidence surface and the exit surface of the prism has an aspheric shape.

* * * * *